Patented Oct. 27, 1925.

1,558,632

UNITED STATES PATENT OFFICE.

HERMAN REINBOLD AND HUGO REINBOLD, OF OMAHA, NEBRASKA; SAID HUGO REINBOLD ASSIGNOR TO SAID HERMAN REINBOLD.

MEDIUM FOR BLEACHING, CRACKING, AND DESULPHURIZING PETROLEUM AND OTHER HYDROCARBON COMPOUNDS AND PROCESS OF PREPARING SAME.

No Drawing. Original application filed January 21, 1924, Serial No. 687,654. Divided and this application filed May 19, 1924. Serial No. 714,471.

*To all whom it may concern:*

Be it known that we, HERMAN REINBOLD and HUGO REINBOLD, citizens of the United States of America, residing at Omaha, in the county of Douglas and State of Nebraska, have invented certain new and useful improvements in mediums for bleaching, cracking, and desulphurizing petroleum and other hydrocarbon compounds and processes of preparing same, of which the following is a specification.

This invention relates to the use of clay, especially a colloid clay of the bentonite type, as a medium for refining and distilling oils and to the processes of preparing and using the same.

The use of anhydrous aluminum chloride has been practised in the refining of petroleum and other oils. The high cost and limited supply thereof, has, however, made its general use impractical.

The objects of the present invention are:

To provide a source of supply for the aluminum chloride:

To provide a highly porous, active substance or base in which the aluminum chloride is held in colloidal dispersion so as to present a maximum active surface for reaction on the hydro-carbons;

To provide in addition to the porous base and aluminum chloride an additional catalyst which will raise the volatilizing temperature of the aluminum chloride so that oils, such as shale oils and high asphalt content oils, which are volatile only at temperatures above that of aluminum chloride may be treated;

To provide a porous colloidal base for either or both the aluminum chloride and the additional catalyst which will in itself be an active agent in the oil refining process.

Other objects and advantages will become apparent in the preparation of the product and in its use as an oil treating medium and it is desired to be understood that all such objects and advantages are anticipated and within the spirit of this invention.

The invention will be described as pertaining to bentonite but is, of course, not limited only to bentonite, it being equally applicable to all colloidal or plastic alumino-silicates, or any other clays which are chemically complex alumino-silicates altered by infiltration or other causes, due to the geological conditions under which they were formed. The process is also applicable to all solid alumino-silicates which can be converted into the hydrous variety by chemical treatment.

Our new oil treating compound or medium is prepared for use by the following steps:

(*a*) *Grinding.*—The clay is ground to size varying from 4 to 7 mesh.

(*b*) *Wetting.*—The ground bentonite is soaked in water sufficient only to penetrate all of the pores of the mineral without forming a "jelly". Bentonite (as explained in our co-pending application Serial No. 669,306, filed Oct. 18, 1923) is a very colloidal clay and has the property of swelling to a jelly-like mass of greatly increased volume upon the addition of water. Therefore, in this step care must be taken to add only enough water to fill the pores without causing it to "jelly" and destroy its original structure and shape.

The water is added for the purpose of reducing the concentration of the hydrochloric acid and preventing the destruction of the structure of the clay by too rapid and violent action.

(*c*) *Chlorination.*—Approximately 90 percent of concentrated hydrochloric acid (HCl) is slowly and gradually added to the wet mineral while it is being stirred and agitated. Because of the greater solubility of the hydrochloric acid at a low temperature this step is carried on at ordinary room temperature. The mixture is now allowed to stand for from 10 to 12 hours. Bentonite is a hydrated aluminum silicate containing in its natural state from 20 to 25 per cent alumina, some infiltrated impurities such as lime, magnesia, iron, etc., and a small percentage of alkalies. These impurities and alkalies have no harmful effect on the compound, however. In this step, aluminum chloride ($Al_2Cl_6$) is formed by the aluminum of the bentonite and the chlorine of the hydrochloric acid, and hydrous silicic acid or silica gel is formed by the splitting of the silica from the bentonite or aluminum silicate. During the setting period the aluminum chloride is adsorbed by the silica gel and held in colloidal and molecular dispersion retaining the original bentonite structure.

In this highly dispersed and highly active condition it presents a maximum surface to the oils being treated.

Should the compound be intended for use on shale oils or other oils or fractionations having a high boiling point, lithium carbonate (or chloride) is gradually added to the mixture after the addition of the hydrochloric acid.

The lithium base forms, in combination with the hydrochloric acid, lithium chloride (LiCl) which is volatile only at temperatures above 600° C., while aluminum chloride, under ordinary conditions, volatilizes at about 183° C. The lithium chloride, however, has further beneficial properties on the compound in that we have found it to be an excellent catalyst, even more active than the aluminum chloride, either alone or in the mixture described and it, therefore, greatly assists the action of the colloid compound. As little as 2 percent lithium chloride has been found to be effectual in raising the volatilizing point of the aluminum chloride. In addition to the effect on the chemical properties, we have found that the addition of a small percentage of lithium salt greatly increases the colloidal properties of the clay. Hydrogen chloride gas can, of course, be substituted in this step for the solution of hydrochloric acid.

(d) *De-watering.*—The mixture is very gradually and carefully heated to a temperature of approximately 300° C. The heating should be continued until all of the mechanically contained water has been driven off and all except from 3 to 5 percent of the water of constitution has been removed from the hydrous silicic acid. Further heating would result in driving out the hydrochloric acid and forming inactive aluminum silicate and in breaking down the structure, of and deactivating the silica gel. It is therefore absolutely essential that a small percentage of the water of constitution remain in the compound.

If the above described process has been carried out successfully, the resulting product is a highly porous, colloidal substance which consists of a loosely chemically-combined, or colloidally and molecularly dispersed, aluminum chloride with a hydrous silicious acid in the form of a solid gel. No aluminum chloride has been volatilized and the material should be nearly neutral and only slightly soluble.

When the above prepared compound, in granular or pulverized form, is mixed with crude petroleum or its fractionations, in the liquid phase, and then boiled and distilled, or if the oil is passed in the vapor phase through the compound, it will, like anhydrous aluminum chloride, not only "crack" or transform the unsaturated hydro-carbons into saturated hydro-carbons, but will according to the constitution of the crude oil and the temperature at which it is distilled, decompose the heavier hydro-carbons into the lighter hydro-carbons and at the same time will decolorize and desulphurize the product.

The most effective method of treating the oils with the improved treating medium has been found to pass the hydro-carbon vapors through a bed of the compound at the proper temperature for the fractionations desired and at atmospheric pressure.

The above noted results in the use of the compound on the crude oils appear to be not only due to the well known action of the aluminum chloride but also to the action of the hydrous silicic acid, which is loosely combined with the aluminum chloride. The hydrous silicic acid acts as a catalyst and assists the action of the aluminum chloride and the lithium chloride and since it has great adsorption properties for vapors and gases, it probably acts as a contact substance releasing the sulphur from the oil.

The action of the lithium chloride in raising the volatile temperature of the aluminum chloride may be explained by ionization.

Before the mineral is used it may be activated by subjecting it to current of warm air to remove hydroscopically contained water as a safeguard in case the mineral may have been exposed to moisture.

While we have described in some detail a preferred method of preparing our medium and of carrying out our process, together with the theories which we believe best explained the success of the process, it is understood that our invention is not limited to the precise procedure described nor is it dependent upon the accuracy of the theories which we have advanced. On the contrary, our invention is not to be regarded as limited except in so far as such limitations are included within the terms of the accompanying claims, in which it is our intention to claim all novelty inherent in our invention as broadly as is permissible in view of the prior art.

This invention was originally claimed in an application for Letters Patent on improvements in medium for bleaching, cracking and desulphurizing petroleum and other hydrocarbon compounds and process of preparing same, filed by us January 21, 1924, bearing Serial No. 687,654. This application and copending application Serial Number 714,470 are divisions of the former application.

Having thus described the invention what we claim and desire secured by Letters Patent is:

1. An oil treating medium comprising hydrous silicic acid in combination with aluminum chloride and lithium chloride.

2. An oil treating medium comprising lithium chloride combined with aluminum chloride.

3. The process of treating an oil refining catalyst for the purpose of raising its volatilizing point comprising: combining with said catalyst, a second catalyst having a higher volatilizing temperature and a similar action.

4. The process of preparing a medium for the refining and distilling of oils comprising: the treating of an alumino-silicate clay with hydrochloric acid and adding lithium chloride.

5. An oil treating medium comprising the resultant of a clay treated with hydrochloric acid and a lithium salt.

6. The process of preparing a medium for the refining and distilling of oils comprising; the treating of an alumino-silicate clay containing constitutional water with hydrogen chloride gas and adding lithium chloride, said alumino-silicate clay acting as an adsorbent for said gas.

7. An oil treating medium comprising the resultant of a clay carrying water of constitution treated with anhydrous hydrochloric acid gas and a lithium base.

8. An oil treating medium comprising the resultant of a clay to which has been added hydrochloric acid and a lithium base.

9. An oil treating medium comprising a base material; aluminum chloride and lithium chloride, said chlorides being held in suspended dispersion in said base material.

10. An oil treating medium comprising a porous base material having adsorptive properties; aluminum chloride and lithium chloride said chlorides being held in suspension in said base material.

11. An oil treating medium comprising aluminum chloride; lithium chloride and hydrous silicic acid mechanically combined in the form of a solid.

12. The process of treating alumino-silicates comprising the adding of lithium chloride to the clay.

In testimony whereof, we affix our signatures.

HERMAN REINBOLD.
HUGO REINBOLD.